Nov. 30, 1954  G. V. WOODLING  2,695,796
COUPLING SLEEVE CONNECTION
Filed Oct. 29, 1952

INVENTOR.
BY George V. Woodling

United States Patent Office 2,695,796
Patented Nov. 30, 1954

2,695,796

COUPLING SLEEVE CONNECTION

George V. Woodling, Cleveland, Ohio

Application October 29, 1952, Serial No. 317,388

5 Claims. (Cl. 285—122)

My invention relates to tube couplings of the non-flare type and in particular to a contractible sleeve for engaging the tube or insertable member.

This application constitutes an improvement in the device shown and described in my Patent 2,553,619, issued May 22, 1951, for Contractible Sleeve for Tube Fittings.

An object of the invention is to provide an auxiliary body or preformed chip in advance of the principal forward end portion of a contractible sleeve.

Another object of the invention is to provide a substantially T-shaped section at the principal forward end portion of a contractible sleeve with the stem of the substantially T-shaped section comprising a V-shaped rib, whereby the forces driving the rib into an insertable member which makes its own groove are substantially balanced on opposite sides of the arm or cross-bar of the T-shaped section.

Still another object of the invention is the provision of constructing the auxiliary body or preformed chip with angularly related sides wherein the included angle between the sides is less than the included angle between the sides of a triangular space in which the auxiliary body or preformed chip is forced or cammed.

A further object of the invention is the provision of an auxiliary body or preformed chip having at the forward end portion thereof an auxiliary rib for biting into and making its own groove in the insertable member.

Another object of the invention is to provide for supporting the material of the tube or insertable member in advance of the V-shaped rib of the contractible sleeve to prevent the supported material from being sheared away.

Another object of the invention is to provide for adding greater holding power to a coupling connection.

Another object of my invention is to eliminate an abutment shoulder on the coupling body against which the end of the tube may abut, whereby the tube may move longitudinally with the sleeve as the sleeve contractibly engages the tube, taken in combination with a contractible sleeve having at its forward end an auxiliary body or preformed chip which supports the material of the tube in advance of the V-shaped rib of the contractible sleeve to prevent the supported material from being sheared away.

Another object of my invention is to prevent the sleeve from shearing or "plowing" up an annular ridge or shoulder of appreciable size around the tube in advance of the sleeve by permitting the tube to longitudinally move along with the sleeve as it contracted about the tube.

Other objects and a fuller understanding of my invention may be had by referring to the following description and claims, taken in combination with the accompanying drawing, in which:

Figure 1:
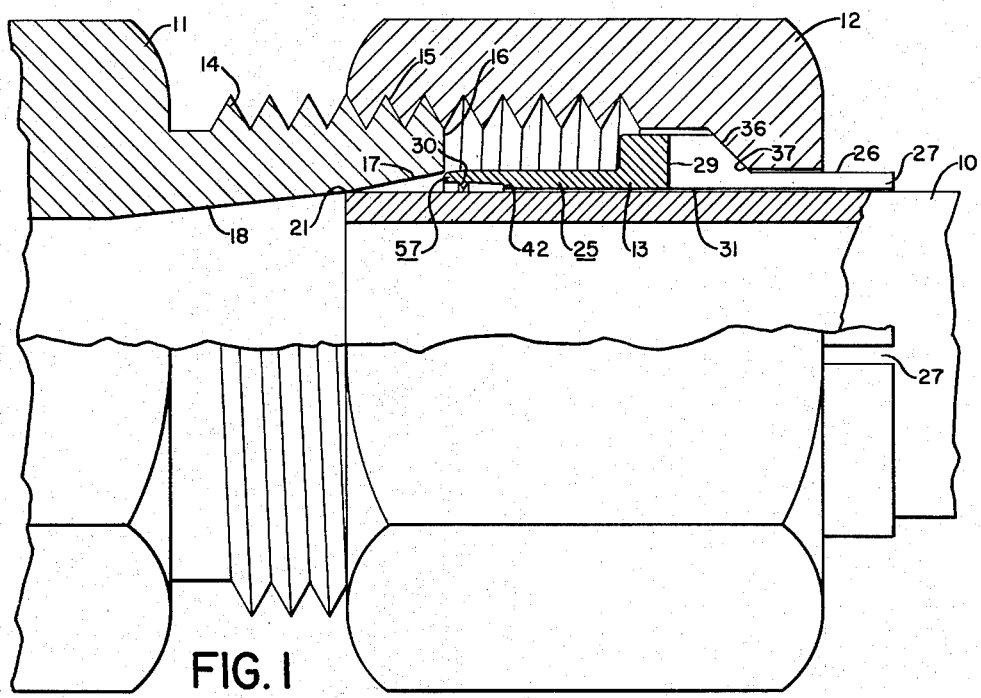
Figure 1 is an enlarged side view of a tube coupling embodying the features of my invention, the upper part being shown in section to illustrate the relationship of the parts prior to the time that the nut is tightened, the view being approximately 5 times scale for a ½ inch tube.

With reference to Figure 1 of the drawing, my invention comprises generally a coupling or connection body 11, a coupling nut 12, and a contractible sleeve 13 adapted to contractibly engage a tube or insertable member 10.

The coupling body 11 is provided at its right-hand end with male threads 14 which are adapted to be threadably engaged by female threads 15 provided in the nut 12 for pressing the sleeve into engagement with the tube. As illustrated, the coupling body 11 is provided with a first entrance flare 17 and a second entrance flare 18 which merges with the bore of the coupling body 11 to receive the tube. The second entrance flare 18 comprises a counterbore having an annular tapered wall section with a very small taper in the order of 2 or 7 degrees into which the end of the tube is wedgingly received to provide a tube seal with the coupling body. The first entrance flare 17 has an annular tapered wall section and extends outwardly toward the end 16 of the coupling body from the counterbore 18. The taper of the first entrance flare 17 may be in the order of 10 to 12 degrees, measured with respect to the longitudinal axis of the tube.

The sleeve 13 has a bore 31 adapted to surround the tube and comprises a continuous annular body 25 provided with rearwardly extending segmental fingers 26 which grip the tube when the nut 12 is tightened. The sleeve is preferably constructed of steel capable of being quench hardenable throughout its entire mass and thereafter tempered or drawn back to a hardness value greater than that of the tube. I find that steel known as 4140, heat treated throughout its entire mass and tempered to a hardness value of approximately 30 to 50 Rockwell, is satisfactory for my sleeve, the hardness value being preferably in the neighborhood of 38 to 42 Rockwell.

In the manufacture of the sleeve, the fingers 26 are provided by making slots 27 in the rearward section thereof at annularly spaced intervals thereabout. In Figure 1, four slots are used but any other number may be used. The continuous annular body 25 has a leading or forward end portion 28 and a rearward end portion 29. As illustrated, the end 29 constitutes the forward terminus for the slots 27. The leading or forward end portion 28 comprises a principal end portion 56 which is provided with an internal annular rib 30 which has two converging walls 33 and 34 that meet to define an annular cutting edge 32 which is adapted to be embedded and cut its own groove in the tube when the sleeve is pressed into the first entrance flare 17 by the nut 12. On the rearward side of the rib, the sleeve is provided with an internal relief bore having a longitudinally extending annular wall 35 which extends rearwardly from the rib 30 and terminating into a laterally or inwardly extending side wall 41 of a stepped shoulder 42. The laterally extending side wall 41 meets with the bore 31 of the sleeve to define a substantially square cutting edge 43 to bite into the tube or insertable member 10. The relief bore is thus defined by the side 34 of the rib 30, the longitudinally extending annular wall 35, and the laterally extending side wall 41 of the stepped shoulder 42. The radial depth of the rib 30, may be approximately .010 to .012 of an inch and the radial depth of the laterally extending side wall 41 may be approximately .008 of an inch. The longitudinal extending internal wall 35 defines, in combination with the external surface of the sleeve, a minimum or weakened wall section, whereby a hinge action is produced, so that the leading principal end section 56 of the sleeve including the rib and the stepped shoulder 42 constitute a readily contractible ring portion which may be cammed or deflected inwardly against the tube notwithstanding the fact that the sleeve is constructed of quench hardenable steel. The thickness of the minimum wall section may be approximately .023 to .025 of an inch which is approximated twice as thick as the radial depth of the rib 30. The thickness of the body portion of the sleeve immediately to the rear of the stepped shoulder may be approximately .033 of an inch, and experience shows that with the distance between the rib 30 and the stepped shoulder 42 being in the neighborhood of twice the maximum radial thickness of the sleeve, namely, approximately one-sixteenth of an inch, the contractible forward principal ring portion including the rib 30 and the stepped shoulder 42 may be readily contractible against the tube with the longitudinally extending annular wall 35 compressed against the tube. The intermediate part of the entire sleeve; that is, the rearward end of the continuous annular body 25 and the forward end of the segmental fingers 26 is enlarged to provide a tapered or cam shoulder 36 against which a cam shoulder 37 of the nut engages for pressing the contractible ring portion including the rib 30 and the stepped shoulder 42 of the sleeve into the first entrance flare 17 and for contracting the segmental fingers 26 about the tube.

Figures 2, 3:
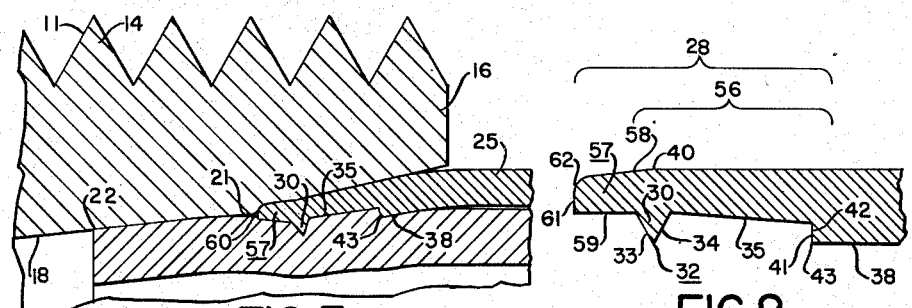
Figure 2 is an enlarged and fragmentary cross-sectional view of the forward end portion of the sleeve shown in Figure 1, the view being approximately 20 times scale.
Figure 3 is a fragmentary view of Figure 1 and shows the relationship of the parts after the nut is tightened, the view being approximately 10 times scale for a ½ inch tube.

It is to be noted in Figures 1 and 3 that the annular tapered wall section of the first entrance flare 17 and the outside surface of the tube or insertable member 10 in advance of the principal forward end portion 56 of the sleeve define substantially a rectangular space with sides forming an apex pointing away from the principal forward end portion of the sleeve. As illustrated in Figures 1, 2 and 3, an auxiliary body 57 is integrally connected to the principal forward end portion 56 and projects toward the apex of the triangular space in advance of the principal forward end portion 56. The auxiliary body, which functions as a preformed chip, has an outer auxiliary cam surface 58 which constitutes a continuation of the outer principal cam surface 40 of the principal forward end portion 56 and has an internal auxiliary supporting surface 59 meeting with the forward side 32 of the V-shaped rib 30. The outer auxiliary cam surface 58 and the internal auxiliary supporting surface 59 terminate in a forward piercing edge 61 having its outer corner rounded at 62. The minimum sleeve wall section to the rear of the rib 30 and the auxiliary body 57 in advance of the rib 30 form with the rib 30 a substantially T-shaped section with the stem of the substantially T-shaped section comprising the V-shaped rib 30. The sides of the crossbar or arm of the T-shaped section comprise, respectively, the auxiliary body 57 and the minimum sleeve wall section between the annular recessed wall 35 and the outer surface of the sleeve. The camming forces driving the V-shaped rib 30 into the tube or insertable member 10 are substantially balanced on opposite sides of the V-shaped rib 30 so that the penetration of the rib 30 into the outside surface of the tube or insertable member 10 is more effective than it would be with unbalanced forces acting on but one side of the V-shaped rib. The thickness of the minimum wall section and the auxiliary body on opposite sides of and adjacent to the V-shaped rib 30 is substantially the same and in actual practice may be approximately .023 to .025 of an inch.

The outer auxiliary cam surface 58 and the internal auxiliary supporting surface 59 define a tapered section with the included angle therebetween ranging from approximately 4 to 8 degees. In Figures 1, 2 and 3, the outer auxiliary cam surface 58 may range from 4 to 8 degrees with the longitudinal axis of the coupling, while the auxiliary supporting surface 59 is substantially parallel with the longitudinal axis. This tapered section is adapted to substantially fill the triangular space defined by the annular tapered wall section of the first entrance flare 17 and the outside surface of the tube or insertable member 10.

In operation, as the sleeve is pressed forward by the tightening of the nut, the outer annular cam surface 40 of the sleeve forcibly engages the tapered wall section of the first entrance flare 17 and thereby produces a camming action which cams or deflects the leading end section of the sleeve against the tube. The camming action embeds the rib 30 and the stepped shoulder 42 into the tube which resists longitudinal pull of the tube from the sleeve. Inasmuch as the end of the tube wedgingly fits within the second entrance flare 18 which is of a very slow taper, the tube is permitted to move along with the sleeve as the rib 30 and the stepped shoulder 42 become imbedded into the tube. Thus, the end of the tube may move from point 21 to point 22 of Figure 3 during the tightening of the nut, the point 21 being the place where the end of the tube becomes arrested when it is manually inserted therein by the operator. Since the tube may move with the sleeve, I prevent the sleeve from shearing or "plowing up" an annular ridge or shoulder of appreciable size around the tube in advance of the rib 30 or shoulder 42 of the sleeve. When the longitudinally extending surface 35 of the relief bore and the internal auxiliary supporting surface 59 engage the tube, they function to aid in limiting the degree to which the rib 30 and the stepped shoulder 42 may be embedded into the tube.

As resistance to longitudinal pressing movement of the sleeve is encountered, the cam shoulder 37 of the nut presses against the cam shoulder 36 of the sleeve and contracts the segmental fingers 26 against the tube for giving support to the tube against vibration. The fingers are disposed to spring back from the tube when the nut is released or disengaged.

As the nut is tightened, the auxiliary body 57 is forced into and substantially fills up the triangular space with the internal auxiliary supporting surface 59 pressed tightly against the tube or insertable member 10 in advance of the V-shaped rib 30. The auxiliary body 57 is harder than the tube or insertable member and supports the material of the tube or insertable member in advance of the V-shaped rib 30 from being sheared away. As shown in Figure 3, the outer surface of the tube or insertable member in advance of the V-shaped rib 30 is somewhat depressed whereby the included angle of the sides of the triangular space is greater than the original angle between the annular tapered wall section of the first entrance flare 17 and the outside of the surface of the tube or insertable member shown in Figure 1 prior to assembly. In actual operation, the angle between the sides of the triangular space may range from substantially 15 to 20 degrees.

The length of the auxiliary body 57 is approximately 1/32 of an inch long and the thickness at the forward edge 61, assuming that the corner 62 is square, is approximately .015 to .020 of an inch. Considering the shape and size of the auxiliary body 57 and realizing further that the included angle between the sides of the tapered section of the auxiliary body 57 ranges from 4 to 8 degrees, it may be wondered how the tapered auxiliary body 57 may fill up a triangular space which has sides defining a much greater angle, namely, 15 to 20 degrees. In actual practice, the tapered auxiliary body 57 completely fills substantially the entire triangular space as shown in Figure 3, but it is not clearly understood why it does. As previously explained, the auxiliary body 57 is harder than the connecter body or the tube, since it is made of hardenable steel which is heat-treated throughout its entire mass and tempered to a relatively high hardness value. The auxiliary body 57, since it is hard, retains its shape and it is believed that the surrounding metal adapts itself to the auxiliary body 57 as the nut is tightened.

Figure 5:
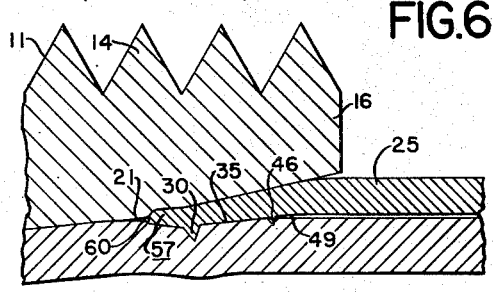
Figure 5 is a fragmentary view similar to Figure 3 with the modified sleeve of Figure 4 cammed or deflected into the tube by the nut.

Tests indicate that the auxiliary body 57 functions as a preformed chip, filling the triangular space with the result that there is no more space into which loose metal from the tube in advance of the V-shaped rib 30 may flow when an extraordinarily heavy longitudinal pull is imposed upon the tube or connector body. In Figures 3 and 5, a small space or crack 60 is illustrated in advance of the forward edge 61 of the auxiliary body 57. It is to be remembered that the Figures 3 and 5 are blown up to ten times actual scale and thus the space or crack 60 would measure approximately .001 to .003 of an inch. However, the inspection of actual cutaway samples does not show such a space or crack identified by the reference character 60.

The dimensions and size of the forward end portion 28 of the sleeve are substantially the same for all sizes of sleeve for tubing ranging from ¼ inch up to two inches. In other words, the forward end portion 28 of the sleeve remains the same regardless of the size of the connector body and nut which are required for tubing ranging from ¼ inch up to two inches. The dimensional tolerances between the connector body, the nut and the tubing also remain substantially the same, and the camming action of the sleeve between the connector body and tube for all sizes of tubing is substantially the same.

In the absence of the auxiliary body 57, loose metal of the tube in front of the rib 30 may shear or skin away to fill the triangular space when an excessive longitudinal pull is imposed upon the tube or connector body. After the triangular space has been filled by loose metal sheared from the tube in advance of the V-shaped rib, then the tube encounters an increased resistance to being pulled out. An object of the present invention is to initially fill up the triangular space by the auxiliary body 57 so that there is no opportunity for any loose metal of the tube in advance of the V-shaped rib to shear away as an extraordinarily heavy pull is placed upon the tube, tending to pull it out of the connector body. The auxiliary body 57 thus adds greater holding power to the coupling connection.

Figure 4:
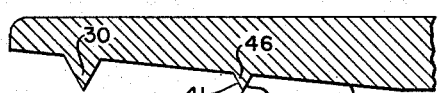
Figure 4 is a modified form of the forward end portion of the sleeve shown in Figure 2.

In Figure 4, I show a modified sleeve in which the stepped shoulder 42 has been replaced by a second rib 46. The laterally or inwardly extending side 41 constitutes a first side of the second rib, which second rib has a second side wall 47 that meets with the first side 41 to define a substantially V-shaped rib with an inner annular cutting edge 48 to bite into the tube. The radial depth of the second rib 46 may be approximately .005 of an inch with approximately a 60 degree included cutting angle being the same as the included angle for the rib 30. In Figure 4, the internal auxiliary supporting surface 59 is disposed at angle ranging from 4 to 8 degrees with the longitudinal axis of the coupling, and is substantially in straight alignment with the recessed surface 35 between the two ribs 30 and 46 and with the recessed surface 49 to the rear of the rib 46. The outer auxiliary surface 58 is substantially in straight alignment with the outer surface of the sleeve. The operation of the auxiliary body in Fig. 4 is substantially the same as that in Figure 2 and prevents the metal of the tube in advance of the rib 30 from being sheared away.

The rib 30 and the stepped shoulder 42 are spaced from each other approximately 1/16 of an inch and this distance is less than the distance that the sleeve is pressed into the internal annular cam surface 17 of the coupling body 11; namely, approximately 1/8 to 3/16 of an inch, when the nut is tightened substantially two to three turns which is the recommended practice in the trade. As the nut is tightened, the end of the tube wedgingly moves longitudinally into the slow taper of the second entrance flare 18, whereby the cutting edge 43 of the stepped shoulder 42 does not "overtake" and bite into the same region of the tube where the rib 30 bites, as it would otherwise do if the end of the tube were abutted against a shoulder in the coupling body which would prevent the tube from moving into the coupling body as the nut is tightened. The same condition holds true for the rib 30 and the second rib 46. The movement of the end of the tube into the slow taper of the second entrance flare 18 prevents the sleeve from shearing or "plowing up" an annular ridge or shoulder of an appreciable size around the tube in advance of the internal rib 30 as well as in advance of the stepped shoulder 42 or the second rib 46.

As the nut is turned on substantially two to three turns, being the condition shown in Figures 3 and 5, it noted that the portion of the bore 31 immediately in the rear of the cutting edge 43 of the stepped shoulder 42, being indicated by the reference character 38 is cammed inwardly against the tube to provide an additional fluid pressure seal therealong. The engagement between the bore portion 38 and the outside of the tube is one of tight compression and is not one where the outside side of the tube has been sheared or cut. It is to be noted that the recessed annular surface 49 immediately to the rear of the second rib 46 likewise cams inwardly against the tube to make an additional fluid pressure seal and this engagement is also one of tight engagement.

Figure 6:
Figure 6 is a further modified form of the forward end portion of the sleeve shown in Figure 4.

In Figure 6, the auxiliary body, which is the same as the auxiliary body in Figures 4 and 5, may be provided with an auxiliary rib 64 at the forward end thereof. The rib 64 operates to penetrate the tube or insertable member 10, as the nut is tightened. The auxiliary rib may be applied to the auxiliary body in Figures 2 and 3, as well as to the auxiliary body in Figures 4 and 5. The depth of the auxiliary rib may range from approximately .003 to .005 of an inch.

The auxiliary supporting surface 59 of the auxiliary body 57 is pressed tightly against the outside surface of the tube or insertable member 10 in advance of the V-shaped rib 30 and forms a good fluid sealing action in addition to the auxiliary body functioning as a preformed chip. The square corner defined by the auxiliary supporting surface 59 and the forward edge 61 may depress itself into the outside surface of the tube or insertable member to the extent of .001 to .003 of an inch, depending upon the hardness of the tube or insertable member. This depressing action is illustrated in Figures 3 and 5. As previously pointed out, the forward piercing edge 61 is approximately .015 to .020 of an inch and, subtracting from this figure the base distance between the sides forming the apex of the triangular crack 60, (.001 to .003 of an inch) and the depth of the embedment of the auxiliary body 57 into the tube 10 (.001 to .003 of an inch), it is noted that the depth of the embedment of the auxiliary body 57 into the second entrance flare 18 may be approximately .009 of an inch as a minimum value. Thus, the embedment of the auxiliary body 57 into the entrance flare 18 is greater than the embedment into the tube, as well as being greater than the base distance between the sides forming the apex of the triangular crack 60 in advance of the piercing forward edge 61. The embedment of the auxiliary body 57 into the second entrance flare 18 and into the tube is illustrated in Figures 3 and 5.

In tightening the nut, it is first turned finger-tight, after which it is turned wrench-tight. When the nut is turned wrench-tight substantially three turns or more, the forward edge 61 of the auxiliary body 57 substantially reaches the point 21, being the beginning of the slow taper or second entrance flare 18, with the result that the auxiliary body 57 is completely impacted or surrounded by the metal of the connector body and the tube or insertable member for making a perfect seal.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A coupling connection for an insertable member comprising first and second coupling members adapted to be connected together, and a contractible sleeve for engaging the insertable member, said first coupling member having an internal annular flare surface to receive the sleeve, and having a tapered annular wall against which the end of the insertable member wedgingly engages, said second coupling member having an inner annular surface terminating in an internal annular shoulder, said contractible sleeve having a bore to receive the insertable member and comprising a continuous annular body having a principal forward end portion, said principal forward end portion having an outer principal cam surface for caming into said annular flare surface of the first coupling member, said principal forward end portion having on its inner surface a cutting edge to bite into and make its own groove in the insertable member for effecting a tight engagement therewith, said annular flare surface of the first coupling member and said insertable member in advance of the principal forward end portion of the sleeve defining substantially a triangular space with sides thereof forming an apex pointing away from the principal forward end portion of the sleeve, an auxiliary body integrally connected to the principal forward end portion and projecting toward the apex of the triangular space in advance of the principal forward end portion, said auxiliary body having an outer auxiliary cam surface constituting a continuation of the outer principal cam surface of the principal forward end portion and having an internal auxiliary supporting surface meeting with said cutting edge, said outer auxiliary cam surface and said internal auxiliary supporting surface terminating in a forward piercing edge, said sleeve having an external shoulder adapted to be engaged by the shoulder of the second coupling member, whereby when the coupling members are drawn together the outer principal cam surface on the principal forward end portion is cammed into the internal annular flare surface of the first coupling member for forcing the cutting edge against the insertable member and cutting its own groove therein, said cutting edge upon cutting its own groove into the insertable member forcing the end of said insertable member with a longitudinal wedging movement against said tapered annular wall, said longitudinal wedging movement permitting said sleeve and the auxiliary body integrally connected thereto to move farther into the internal annular flare surface and reducing said triangular space to a small triangular crack in advance of the said piercing forward edge when the coupling members are drawn tightly together, said auxiliary body being harder than the insertable member and the internal annular flare surface and constituting a preformed chip to substantially fill the triangular space as it moves along with the insertable member during said longitudinal wedging movement, said forward edge of the auxiliary body during said longitudinal movement piercing into the sides forming the apex of the triangular space with the internal auxiliary supporting surface embedding itself into the insertable member and with the outer auxiliary cam surface embedding itself into said internal flare surface, the depth of the embedment of the auxiliary body into the internal flare surface being greater than that of the auxiliary body into the insertable member, said auxiliary body substantially filling the triangular space to the extent that only said small triangular crack lies in advance of the piercing forward edge of the auxiliary body, and said auxiliary body supporting the material of the insertable member in advance of the cutting edge of the sleeve.

2. A coupling connection for an insertable member comprising first and second coupling members adapted to be connected together, and a contractible sleeve for engaging the insertable member, said first coupling member having an internal annular flare surface to receive the sleeve and having a tapered annular wall against which the end of the insertible member wedgingly engages, said second coupling member having an inner annular surface terminating in an internal annular shoulder, said contractible sleeve having a bore to receive the insertable member and comprising a continuous annular body having a principal forward end portion, said principal forward end portion having an outer principal cam surface for camming into said annular flare surface of the first coupling member, said principal forward end portion having on its inner surface an internal substantially V-shaped rib defining a cutting edge to bite into and make its own groove in the insertable member for effecting a tight engagement therewith, said annular flare surface of the first coupling member and said insertable member in advance of the principal forward end portion of the sleeve defining substantially a triangular space with sides thereof forming an apex pointing away from the principal forward end portion of the sleeve, an auxiliary body integrally connected to the principal forward end portion and projecting toward the apex of the triangular space in advance of the principal forward end portion, said auxiliary body having an outer auxiliary cam surface constituting a continuation of the outer principal cam surface of the principal forward end portion and having an internal auxiliary supporting surface meeting with said cutting edge, said outer auxiliary cam surface and said internal auxiliary supporting surface terminating in a forward piercing edge, said sleeve having an external shoulder adapted to be engaged by the shoulder of the second coupling member, whereby when the coupling members are drawn together the outer principal cam surface on the principal forward end portion is cammed into the internal annular flare surface of the first coupling member for forcing the cutting edge against the insertable member and cutting its own groove therein, said rib upon cutting its own groove into the insertable member forcing the end of said insertable member with a longitudinal wedging movement against said tapered annular wall, said longitudinal wedging movement permitting said sleeve and the auxiliary body integrally connected thereto to move farther into the internal annular flare surface and reducing said triangular space to a small triangular crack in advance of the said piercing forward edge when the coupling members are drawn tightly together, said auxiliary body being harder than the insertable member and the internal annular flare surface and constituting a preformed chip to substantially fill the triangular space as it moves along with the insertable member during said longitudinal wedging movement, said forward edge of the auxiliary body during said longitudinal movement piercing into the sides forming the apex of the triangular space with the internal auxiliary supporting surface embedding itself into the insertable member and with the outer auxiliary cam surface embedding itself into said internal flare surface, the depth of the embedment of the auxiliary body into the internal flare surface being greater than that of the auxiliary body into the insertable member, said auxiliary body substantially filling the triangular space to the extent that only said small triangular crack lies in advance of the piercing forward edge of the auxiliary body, and said auxiliary body supporting the material of the insertable member in advance of the rib.

3. A coupling connection for an insertable member comprising first and second coupling members adapted to be connected together, and a contractible sleeve for engaging the insertable member, said first coupling member having an internal annular flare surface to receive the sleeve and having a tapered annular wall against which the end of the insertible member wedgingly engages, said second coupling member having an inner annular surface terminating in an internal annular shoulder, said contractible sleeve having a bore to receive the insertable member and comprising a continuous annular body having a principal forward end portion, said principal forward end portion having an outer principal cam surface for camming into said annular flare surface of the first coupling member, said principal forward end portion having on its inner surface a cutting edge to bite into and make its own groove in the insertable member for effecting a tight engagement therewith, said annular flare surface of the first coupling member and said insertable member in advance of the principal forward end portion of the sleeve defining substantially a triangular space with sides thereof forming an apex pointing away from the principal forward end portion of the sleeve, an auxiliary body integrally connected to the principal forward end portion and projecting toward the apex of the triangular space in advance of the principal forward end portion, said auxiliary body having an outer auxiliary cam surface constituting a continuation of the outer principal cam surface of the principal forward end portion and having an internal auxiliary supporting surface meeting with said cutting edge, said outer auxiliary cam surface and said internal auxiliary supporting surface terminating in a forward piercing edge, said sleeve having an external shoulder adapted to be engaged by the shoulder of the second coupling member, whereby when the coupling members are drawn together the outer principal cam surface on the principal forward end portion is cammed into the internal annular flare surface of the first coupling member for forcing the cutting edge against the insertable member and cutting its own groove therein, said cutting edge upon cutting its own groove into the insertable member forcing the end of said insertable member with a longitudinal wedging movement against said tapered annular wall, said longitudinal wedging movement permitting said sleeve and the auxiliary body integrally connected thereto to move farther into the internal annular flare surface and reducing said triangular space to a small triangular crack in advance of the said piercing forward edge when the coupling members are drawn tightly together, said auxiliary body being harder than the insertable member and the internal annular flare surface and constituting a preformed chip to substantially fill the triangular space as it moves along with the insertable member during said longitudinal wedging movement, said forward edge of the auxiliary body during said longitudinal movement wedging itself between the sides forming the apex of the triangular space with the internal auxiliary supporting surface moving along with the insertable member and with the outer auxiliary cam surface moving relatively to said internal flare surface, said auxiliary body substantially filling the triangular space to the extent that only said small triangular crack lies in advance of the piercing forward edge of the auxiliary body, and said auxiliary body supporting the material of the insertable member in advance of the cutting edge of the sleeve.

4. A coupling connection for an insertable member comprising a coupling member, and a contractible sleeve for engaging the insertable member, said coupling member having an internal annular flare surface to receive the sleeve and including a tapered annular wall against which the end of the insertable member wedgingly engages, said contractible sleeve having a bore to receive the insertable member and comprising a continuous annular body having a principal forward end portion, said principal forward end portion having an outer principal cam surface for camming against said annular flare surface of the coupling member, said principal forward end portion having on its inner surface a cutting edge to bite into the insertable member, said annular flare surface of the coupling member and said insertable member in advance of the principal forward end portion of the sleeve defining substantially a triangular space with sides thereof forming an apex pointing away from the principal forward end portion of the sleeve, an auxiliary body integrally connected to the principal forward end portion, and projecting toward the apex of the triangular space in advance of the principal forward end portion, said auxiliary body having an outer auxiliary cam surface constituting a continuation of the outer principal cam surface of the principal forward end portion and having an internal auxiliary supporting surface meeting with said cutting edge, said outer auxiliary cam surface and said internal auxiliary supporting surface terminating in a forward piercing edge, means for forcing said sleeve against the coupling member whereby the outer principal cam surface on the principal forward end portion is cammed against the internal annular flare surface of the coupling member for forcing the cutting edge against the insertable member, said cutting edge upon biting the insertable member forcing the end of said insertable member with a longitudinal wedging movement against said tapered annular wall, said longitudinal wedging movement permitting said sleeve and the auxiliary body integrally connected thereto to move longitudinally an additional amount relative to the internal annular flare surface and reducing said triangular space to a small triangular crack in advance of the said piercing forward edge when the sleeve is forced against the coupling member, said auxiliary body being harder than the insertable member and being cammed inwardly in a radial direction against the insertable member by the internal annular flare surface and constituting a preformed chip to substantially fill the triangular space as it moves along with the insertable member during said longitudinal wedging movement, said forward edge of the auxiliary body during said longitudinal movement wedging itself between the sides forming the apex of the triangular space with the internal auxiliary supporting surface moving along with the insertable member and with the outer auxiliary cam surface moving relatively to said internal flare surface, said auxiliary body substantially filling the triangular space to the extent that only said small triangular crack lies in advance of the piercing forward edge of the auxiliary body, and said auxiliary body supporting the material of the insertable member in advance of the cutting edge of the sleeve.

5. A coupling connection for an insertable member comprising a coupling member, and a contractible sleeve for engaging the insertable member, said coupling member having an internal annular flare surface to receive the sleeve and including a tapered annular wall against which the end of the insertable member wedgingly engages, said contractible sleeve having a bore to receive the insertable member and comprising a continuous annular body having a principal forward end portion, said principal forward end portion having an outer principal cam surface for camming against said annular flare surface of the coupling member, said principal forward end portion having on its inner surface an internal rib provided with a circumferential cutting edge to bite into the insertable member, said annular flare surface of the coupling member and said insertable member in advance of the principal forward end portion of the sleeve defining substantially a triangular space with sides thereof forming an apex pointing away from the principal forward end portion of the sleeve, an auxiliary body integrally connected to the principal forward end portion and projecting toward the apex of the triangular space in advance of the principal forward end portion, said auxiliary body having an outer auxiliary cam surface constituting a continuation of the outer principal cam surface of the principal forward end portion and having an internal auxiliary supporting surface meeting with said cutting edge, said outer auxiliary cam surface and said internal auxiliary supporting surface terminating in a forward edge, means for forcing said sleeve against the coupling member whereby the outer principal cam surface on the principal forward end portion is cammed against the internal annular flare surface of the coupling member for forcing the cutting edge against the insertable member, said cutting edge upon biting the insertable member forcing the end of said insertable member with a longitudinal wedging movement against said tapered annular wall, said longitudinal wedging movement permitting said sleeve and the auxiliary body integrally connected thereto to move longitudinally an additional amount relative to the internal annular flare surface and reducing said triangular space to a small triangular crack in advance of the said forward edge when the sleeve is forced against the coupling member, said auxiliary body being harder than the insertable member and being cammed inwardly in a radial direction against the insertable member by the internal annular flare surface and constituting a preformed chip to substantially fill the triangular space as it moves along with the insertable member during said longitudinal wedging movement, said forward edge of the auxiliary body during said longitudinal movement wedging itself between the sides forming the apex of the triangular space with the internal auxiliary supporting surface moving along with the insertable member and with the outer auxiliary cam surface moving relatively to said internal flare surface, said auxiliary body substantially filling the triangular space to the extent that only said small triangular crack lies in advance of the forward edge of the auxiliary body, and said auxiliary body supporting the material of the insertable member in advance of the cutting edge of the sleeve.

References Cited in the file of this patent

UNITED STATES PATENTS

| Number | Name | Date |
| --- | --- | --- |
| 1,793,455 | Buchanan | Feb. 24, 1931 |
| 1,889,778 | Dobrick | Dec. 6, 1932 |
| 2,139,413 | Kriedel | Dec. 6, 1938 |
| 2,452,278 | Woodling | Oct. 26, 1948 |
| 2,553,619 | Woodling | May 22, 1951 |
| 2,613,959 | Richardson | Oct. 14, 1952 |

FOREIGN PATENTS

| Number | Country | Date |
| --- | --- | --- |
| 241,689 | Great Britain | Oct. 29, 1925 |